United States Patent
Neumark

(10) Patent No.: US 6,550,674 B1
(45) Date of Patent: Apr. 22, 2003

(54) SYSTEM FOR CATALOGING AN INVENTORY AND METHOD OF USE

(76) Inventor: Yoram Neumark, 273 Giotto, Irvine, CA (US) 92614

(*) Notice: Subject to any disclaimer, the term of this patent is extended or adjusted under 35 U.S.C. 154(b) by 0 days.

(21) Appl. No.: 10/226,475

(22) Filed: Aug. 23, 2002

(51) Int. Cl.⁷ .............................................. G06K 15/00
(52) U.S. Cl. ...................... 235/383; 235/385; 235/470; 235/472.02; 705/28
(58) Field of Search ................................. 235/375, 383, 235/384, 385, 462.01, 462.13, 462.45, 462.44, 470, 472.01, 472.02; 705/22, 28; 340/14.1, 505, 572.1, 572.4, 573.1, 825.36; 342/42, 50, 450, 451, 463, 465; 700/213, 214, 215, 225, 226

(56) References Cited

U.S. PATENT DOCUMENTS

| | | | |
|---|---|---|---|
| 4,135,241 A | | 1/1979 | Stanis et al. |
| 5,383,112 A | * | 1/1995 | Clark ........................ 705/28 X |
| 5,565,858 A | | 10/1996 | Guthrie |
| 5,682,142 A | * | 10/1997 | Loosmore et al. ........ 340/572.1 |
| 5,712,789 A | * | 1/1998 | Radican ....................... 700/226 |
| 5,804,810 A | * | 9/1998 | Woolley et al. ......... 235/375 X |
| 5,873,070 A | | 2/1999 | Bunte et al. |
| 5,959,568 A | | 9/1999 | Woolley |
| 5,960,413 A | | 9/1999 | Amon et al. |
| 6,121,926 A | * | 9/2000 | Belcher et al. ............. 342/450 |
| 6,123,259 A | * | 9/2000 | Ogasawara ......... 235/462.45 X |
| 6,311,892 B1 | | 11/2001 | O'Callaghan et al. |
| 6,335,685 B1 | * | 1/2002 | Schrott et al. ........... 340/572.1 |
| 6,341,271 B1 | | 1/2002 | Salvo et al. |
| 6,343,276 B1 | | 1/2002 | Barnett |
| 6,386,450 B1 | * | 5/2002 | Ogasawara .................. 235/383 |
| 6,388,569 B1 | | 5/2002 | Engellenner |
| 2002/0008621 A1 | | 1/2002 | Barritz et al. |
| 2002/0046142 A1 | * | 4/2002 | Ishikura ....................... 705/28 |
| 2002/0126013 A1 | * | 9/2002 | Bridgelall ................ 340/572.1 |
| 2002/0158133 A1 | * | 10/2002 | Conzola et al. ........ 235/462.45 |
| 2003/0011477 A1 | * | 1/2003 | Clapper ................... 340/573.1 |

FOREIGN PATENT DOCUMENTS

| | | | |
|---|---|---|---|
| JP | 4-372098 A | * | 12/1992 |
| JP | 2002-41758 A | * | 2/2002 |
| WO | WO94/10774 | | 5/1994 |
| WO | WO00/77704 | | 12/2000 |

* cited by examiner

Primary Examiner—Michael G. Lee
Assistant Examiner—Jared J. Fureman
(74) Attorney, Agent, or Firm—Gene Scott-Patent Law & Venture Group

(57) ABSTRACT

An inventory control and management method provides a combination mobile device for communication and for reading labels (R&C). The R&C reads an inventory label affixed to an item of inventory in the stores. A data file is created corresponding to the label reading and includes a time stamp taken at the time of the reading. The data file is imported into a computer data processor. A network of fixed distributed communication nodes (transceivers) is positioned over the inventory store for receiving temporal cyclic signature pulses from the R&C. At least three of the communication nodes are used to perform a triangulation for locating the R&C, and the location and the corresponding time is recorded. By comparing the time of a given reading of the label with a corresponding time of the triangulation, it is possible to determine where any item is located within the stores.

7 Claims, 1 Drawing Sheet

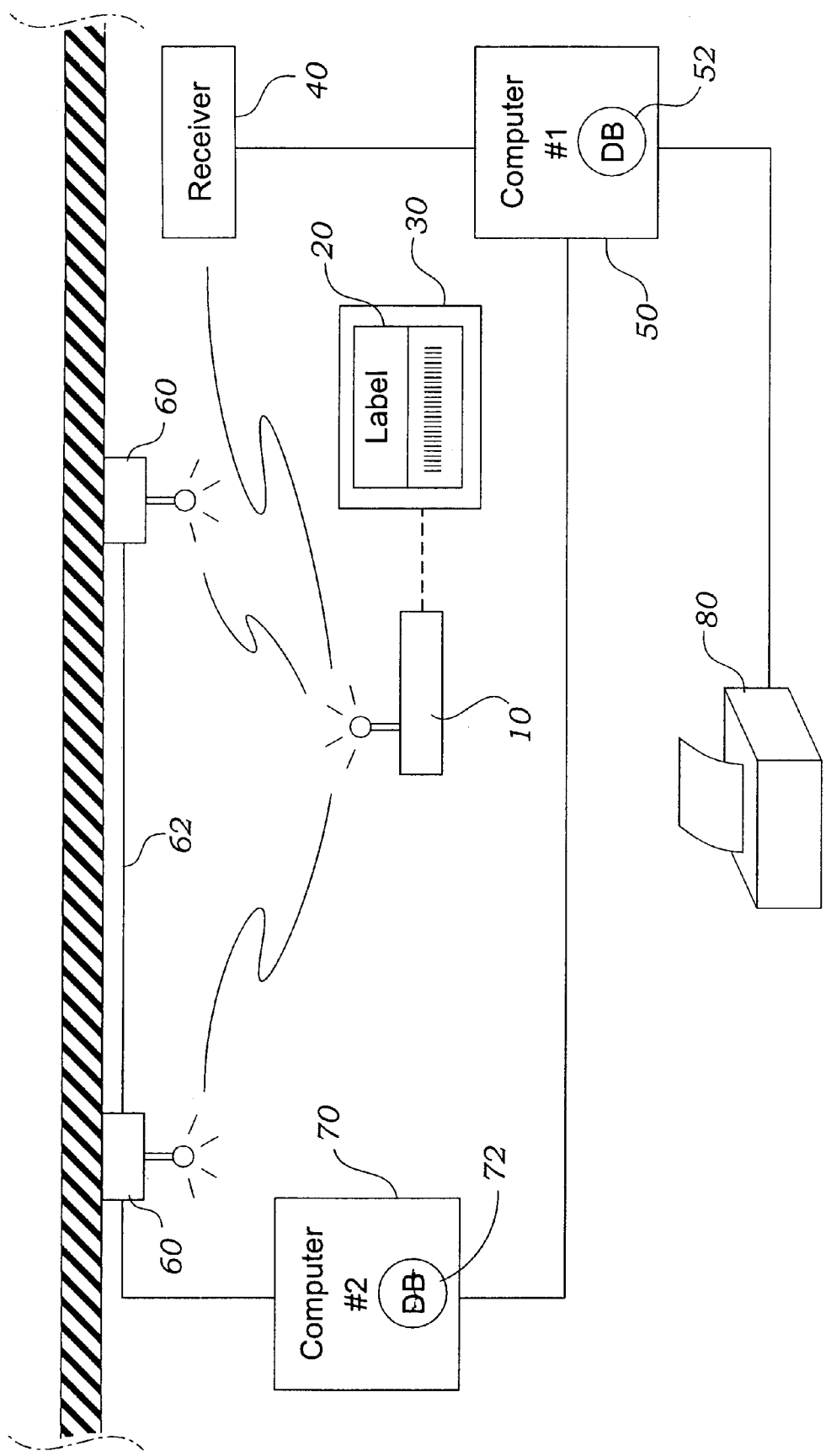

SYSTEM FOR CATALOGING AN INVENTORY AND METHOD OF USE

BACKGROUND OF THE INVENTION

INCORPORATION BY REFERENCE

Applicant(s) hereby incorporate herein by reference, any and all U. S. patents, U.S. patent applications, and other documents and printed matter cited or referred to in this application.

1. Field of the Invention

This invention relates generally to inventory systems and more particularly to such a system capable of locating items of inventory in a three-space environment.

2. Description of Related Art

The following art defines the present state of this field:

Barritz et al., U.S. 20020008621 describes a system and method, which allows the identity of assets and their physical locations to be mapped and associated with one another. The invention includes a locator tool which receives an input which allows the tool to determine its own spatial location and thereby the spatial locations of various objects such as furniture, computer equipment, and structural components such as doors, windows to be identified and located and thereafter mapped in the form of architectural layout, diagrams, and the like. The invention is also an inventory system as well as a verification system that allows objects or assets to be inventoried, tracked, or verified against purchasing lists or the like.

Stanis et al., U.S. Pat. No. 4,135,241 describes a data handling system for a hospital or like establishment. The system keeps track of bed allocation, changes in inventory, and charges to patients, and also serves as a communication network for the hospital. Data is fed into the system in the form of pre-punched cards bearing patient information, inventory data, and commands or messages, and thus unskilled personnel can quickly feed data into the system without error. Message data is routed directly to teleprinters at addressed locations. Bed allocation and patient data, and charge and inventory data are respectively stored in separate magnetic drum storage areas. Searching facilities are provided which can locate desired data entries in either storage area and mark these entries for printout, and separate printout circuitry then transfers marked data items to the proper addresses in the proper format. At the end of each day, a final search is performed which produces a printout of all charges organized by patient number. A tally inventory search is also performed which produces a printout of inventory changes organized by item number and by department number. The tally search is cumulative, and a tally arithmetic unit summarizes inventory data for each separate item before printout. A running record is kept of each day's total charges, credits, and payments on account in a central core memory, and this record is continually updated by a central arithmetic unit.

Guthrie, U.S. Pat. No. 5,565,858 describes a device, which locates a container from a group of containers utilizing an electronic tag; the electronic tag is capable of being positioned in close proximity to one of the containers. The electronic tag includes at least one long-range transceiver portion and at least one short-range transceiver portion. Each long-range transceiver portion is capable of communicating with either a short-range transceiver portion associated with another electronic tag, or an interrogator unit. Each short-range transceiver portion is capable of communicating with a long-range transceiver portion of another electronic tag. The device assists in locating a container, relative to other containers, when the containers are stored in a stacked or nested configuration. A global positioning system (GPS) can be utilized to locate the position of the containers on the Earth's surface.

Bunte et al., U.S. Pat. No. 5,873,070 describes an improved data collection system utilizing at least partially integrated data collection and gathering devices and related peripherals. The system includes an at least partially wearable data collection terminal, associated peripherals, and a communication system. The data collection system may utilize a wearable data collection terminal having a computer processor, associated memory, inputs, and outputs. Associated peripheral devices may include voice inputs and outputs; an optically readable information set reader, a keyboard and/or touch-panel, intelligent-body-conforming battery packs, mass storage devices, user position and next task location device, a display, a printer, and a data communication system for both local area and wide area communication.

Woolley, U.S. U.S. Pat. No. 5,959,568 describes an object in a storage area or moving vehicle that is monitored by attaching an electronic tag to the object. An electronic device detects the presence of the object by communicating with the tag while the object is in storage or is being moved by the vehicle. The tags may also determine the location of an attached object and may reroute the object if it deviates from a given shipping schedule. A group of objects is monitored by two electronic tags, each attached to an object in the group. Each tag has circuitry for communicating information relating to an object in the group to a second tag. Each tag also includes a memory connected to the circuitry that is capable of storing the information, and a controller connected to the memory and the circuitry. A distance is measured by transmitting multiple symbols from one object to another object, having the symbols returned such that the symbols' measured round-trip times are not all identical, and calculating the distance using the measured round-trip times.

Amon et al., U.S. Pat. No. 5,960,413 describes a scanning radar unit or a phased array scanning radar unit, for the purposes of additionally obtaining unit interior topological information. Such interior information is required to determine an accurate tally count in the case where two or three boards such as, have been longitudinally aligned to span the entire board row of a given coarse (a technique referred to as "nesting"). In the case of scanning radar unit, this additional interior topology information is gathered by emitting a focused pulsed incident scanning energy beam, which is of an energy chosen to be transmissive to paper wrap materials which might be covering unit and to the lumber of unit itself. As beam transmits through "nested" boards such as it will encounter a board row break such as where the two boards are abutted. Either board end, which defines this break, will have been previously demarcated during unit construction by a reflective material. This reflective marking will cause the incident beam to reflect back towards scanning radar unit as reflective beam. The reflective information obtained by unit is input to the unit interior topological processor which then determines the three dimensional locations of all board row breaks within lumber unit which is communicated to computer. Computer then combines this interior end surface information with the exterior information to provide a precise tally count of unit.

O'Callaghan et al., U.S. Pat. No. 6,311,892 describes Apparatus for automatically acquiring and verifying, relative to pre-established rules, information affixed to relatively flat articles transported along a transport path comprises weighing means for measuring weight of articles being processed, image acquisition means for acquiring a representation of indicia appearing on an article, processing means for recognition of the indicia appearing on an article, and processing means for verifying acquired data against the pre-established rules.

Salvo et al., U.S. Pat. No. 6,341,271 describes an inventory management system that automatically monitors inventory amounts, provides information concerning inventory, and decides if an order for replacement inventory should be placed. The system includes a storage for inventory, an indicator for monitoring and reporting the level of current inventory, and a controller for receiving information from different inventory suppliers and for integrating such information with information on current inventory amounts and estimated future use to decide if an order for replacing inventory should be made. An order is placed automatically to a supplier and the progress for the delivery of replacement inventory is automatically monitored. A method using this system for managing inventory includes the steps of automatic gathering information about the current inventory and deciding whether and when replacement inventory should be ordered.

Barnett, U.S. Pat. No. 6,343,276 describes a shoe size scanner system that is an automated system for use in retail stores, and particularly in shoe stores. The scanner system has a base unit which interfaces with the store's computerized inventory system, and a plurality of remote units, which interface with the base unit. The remote units include at least the input device of a bar code scanner, and may be either fixed mount or portable, handheld scanning units. The fixed mount units are positioned in fixed locations, such as display shelves or tables and may be used by either store clerks or customers. The handheld units are intended for use by sales clerks, and may be supported by a neck strap, armband, or belt clip. According to the shoe size scanner system, each shoe on display in the store has a bar code affixed thereto which encodes an identifier number corresponding to the model of the shoe. Either a sales clerk or a customer may scan the bar code with the remote unit, which communicates with the base unit and returns identification of the shoe model. The sales clerk or customer may then select one of three function keys so that the remote unit will display, for that particular model, either (1) a list of all shoe sizes in stock; (2) a response indicating whether the shoe is in stock in a specified length and width; or (3) a list of all shoe widths in stock in a specified length. Price information for each shoe listed in the response is provided.

Engellenner, U.S. Pat. No. 6,388,569 describes a method and apparatus for location of objects to facilitate retrieval, filing, security, inventory stock-keeping and the like. The methods and apparatus employ a tag element associated with each object-to-be-located, and interrogation system for searching one or more spatial regions for such tagged items, as well as mechanisms for identifying objects within the interrogated region.

Norand Corporation, WO94/10774 describes an apparatus for a radio communication network having a multiplicity of mobile transceiver units selectively in communication with a plurality of base transceiver units which communicate with one or two host computers for storage and manipulation of data collected by bar code scanners or other collection means associated with the mobile transceiver units. The radio network is adaptive in that in order to compensate for the wide range of operating conditions a set of variable network parameters are exchanged between transceivers in the network. These parameters define optimized communication on the network under current network conditions. Examples of such parameters include: the length and frequency of the spreading code in direct-sequence spread spectrum communications; the hop frame length, coding, and interleaving in frequency-hopping spread spectrum communications; the method of source encoding used; and the data packet size in a network using data segmentation.

Creative Golf Designs, Inc., WO 0077704 describes an inventory control system, which includes anti-collision, radio frequency identification apparatus or tags affixed to each item of an inventory and including a unique modulation code, an interrogator/reader that generates a field of sufficient range to activate each tag associated with each item of the inventory in communication with a computer. The computer includes a list comprising an identifier for each item in the inventory, the modulation code for the tag associated with each item in the inventory and an item status where the status indicates whether the item is present or absent.

The prior art teaches systems for: locating inventory, inventory management and control, stacked containers, data collection, measuring distance, portable identification and classification, verification, scanning shoes, electronic location, and for applying adaptive communication parameters, but does not teach a system for locating items of inventory in three-space in an inexpensive and adaptive manner. The present invention fulfills these needs and provides further related advantages as described in the following summary.

SUMMARY OF THE INVENTION

The present invention teaches certain benefits in construction and use which give rise to the objectives described below.

The present invention is an inventory control and management method for use in large inventory stores such as warehouses containing thousands of items. Such items may be of any type, such as automobiles, tires, hardware, tools, foodstuffs, and so on, and may be stored in a two-dimensional array, such as with automobiles on a sales lot, or in a three-dimensional array (in three-space) such as in aisles and racks. In modern warehouses, such racks may be tens of feet in height and it is important to determine where small items are in a warehouse that may consume a square city block or more, and be 20 to 30 feet in height.

To accomplish the inventory control and management method of the present invention provides a combination mobile device for reading labels and for communication (R&C). The R&C is used in an inventory stores. It is positioned for reading an inventory label affixed to an item of inventory in the store. A data file is created corresponding to the label reading and includes a time stamp taken at the time of the reading. The data file is transmitted using radio transmission from the R&C to a receiver and is then imported into a computer data processor. A network of fixed distributed communication nodes (transceivers) is positioned over the inventory store for receiving temporal cyclic signature pulses from the R&C which are transmitted constantly. At least three of the communication nodes within communication range, at any time, of the R&C are used to preform a triangulation for locating the R&C, and the location of the R&C in three space is recorded. A corresponding time for each one of the signature pulses is likewise recorded. In this manner a record of the location of the R&C is maintained constantly, and by comparing the time of a given reading of the label with a corresponding time of the triangulation of the location of the R&C, it is possible to determine where any item is located within the stores.

A primary objective of the present invention is to provide an apparatus and method of use of such apparatus that provides advantages not taught by the prior art.

Another objective is to provide such an invention capable of recording the nature and location in three-space, of items in an inventory stores.

A further objective is to provide such an invention capable of high accuracy in locating items so that the method may be used with small items.

A still further objective is to provide such an invention capable of keeping a record of the movements of plural information retrieving devices in a large inventory stores such as a warehouse.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawing illustrates the present invention. In such drawing:

FIG. 1 is a conceptual diagram of the preferred embodiment of the invention.

DETAILED DESCRIPTION OF THE INVENTION

The above described drawing figures illustrate the invention in at least one of its preferred embodiments, which is further defined in detail in the following description.

The present invention is a method wherein a combination mobile means for reading labels and for communication (R&C) 10 is employed. One such device or hundreds may be used at the same time depending on the size and nature of the inventory management objective. In this description, we refer to a single R&C 10, but it should be realized that many such units would normally be employed simultaneously in the present method. The communication means of the R&C 10 provides two wireless functions. To accomplish its objectives the communication means is able to transmit digital information over relatively short distances, as allowed by FCC rules, employing any well known and common analog or digital wireless communication technique as described in the prior art. It also is able to transmit a low power ultra wide band (UWB) communication signal which is particularly suitable in the present application, as will be shown. Other communication protocols that are well known in communication engineering could be used in place of UWB. Likewise, the label reading means part of the R&C 10 may be any well known optical, mechanical, electrical, electrostatic, or magnetic system for reading bar code or other printed coding. Such inventory labels may be radio tags, bar code labels and other well known tags capable of labeling inventory. However, the reader must be of the type that requires its position to be quite close or in contact with the label to be read. Such proximity readers include magnetic swipe types, optical bar code types, and others. Proximity is necessary because the communication means part of the R&C 10 enables the location of the reader, i.e., the item being read, to be determined. When the reader is close to the item, or touching it, and when the communication means is, likewise, very close, the accuracy of the location is improved. Therefore, it is a preferred technique to use a single, miniature hand-held device with contact label reading and communication capabilities. The importance of the proximity of the R&C 10 to the inventory item will be understood in the following disclosure.

The method includes the step of manually positioning the R&C 10 for taking a reading, and then taking a reading of an inventory label 20 or other indicia affixed to, or adjacent to, a selected inventory item 30 in an inventory stores. This process may be repeated for one item after the next until an entire inventory of stores is taken, or it may be completed for only one or a few items as desired. A common need in inventory management is to determine the nature or identity of inventory items and also their location, and the present method can accomplish this economically and efficiently. The next step in the present invention method is to create a data file in the R&C corresponding to the label reading and a corresponding first time stamp taken at the time of the label reading. Thus, the R&C 10 has a data file creating capability as is known in the art, and also has a time stamping capability, as is also well known in the art. This step is known, for instance, in the supermarket and grocery trade, each time an item is scanned at a checkout counter, its identity is recorded as a data file, which is then imported into a database and the current known inventory count of the item is reduced by one. Similarly here, the data file is transmitted by wireless communication, as described above and shown in FIG. 1, from the R&C to a receiver 40 using any well known method of moving data from a point of origin to a point where analysis will be conducted, and preferably employs digital wireless transmission. In like manner, the data file is transported, usually over an electrical cable, from the receiver 40 to a first data processor 50 such as any digital computer where the data file is stored in a database as a record. Such a record will contain information such as, item description, item serial or stocking number, item count or quantity, item date, and so on. The record also contains the date and time of day that the reading took place. The data base may contain hundreds, or many hundreds of such records, and the means for creating such a database and of importing information, such as describe here, into the database is very well known in the art.

A further aspect of the present invention is to provide a network of fixed distributed communication nodes 60 positioned over or near the inventory stores. The need for this step will become apparent as the present method is further described below. Each of the communication nodes 60 is preferably an electrical signal transceiver device with antenna, capable of both receiving and transmitting wireless electrical signals. Such devices are extremely inexpensive when employed for low power and limited range applications. The number of nodes required in the present method will depend upon the size of the inventory stores, the output power of the R&C 10, signal to noise ratio in the communication channel space, type of transmission: analog or digital, and other factors well known to communications engineers. Physically, the nodes 60 may be mounted on or from a ceiling of a warehouse, or other building structure, or may be mounted on a network of wires strung or hung from a ceiling or from poles in an indoor or out of doors stores and this is well known in the art. In one embodiment, shown in FIG. 1, the nodes 60 are wireless receivers interconnected by electrical conductors 62 for sharing information. The R&C 10 is a transmitter, as was described above. In addition to transmitting scan information to the receiver 40, the R&C 10 also emits a UWB pulsed signal on a continuous basis. UWB transmission packages digital information, in the present case, the identity of the R&C, that is contained in very short pulses transmitted over a wide swath of spectrum rather than at a specific frequency. The signal is able to use ultra low power, being transmitted at roughly four orders of magnitude below typical output power rating for conventional RF transmissions. Preferably, single UWB monocycles are transmitted from the R&C's antenna and by precisely positioning these monocycles in time and using matched antennas at the nodes 60, highly efficient communication is possible. Because a wide spectrum is used, the UWB technique is only able to be employed locally to avoid interference with common carriers. On the other hand, such UWB signals are typically immune to local interference which takes up only a small portion of spectrum. As stated, the UWB signals are received by any of the nodes 60 that are within range of an operating R&C 10. As stated, preferably a constant stream of pulsed UWB signals is being transmitted by the R&C 10 and received by the nodes 60. Upon receipt, the UWB signals receive a second time stamp, or the UWB signal itself may contain the time stamp from the R&C 10. Information contained in the UWB signals are sent to a second data processor 70 or computer where the UWB information from at least three nodes 60, enable a determination of the location of the R&C 10 in three-space through triangulation. In one embodiment, the triangulation method for locating the R&C 10 in three-space uses discrimination of received time of the signature signals at, at least three of the communication nodes 60, to determine location. This approach requires that the clocks of the nodes 60 are synchronized. Each node receives the UWB signal from the R&C 10 and either time stamps it or it may already have a time stamp at the R&C at the moment of label recording. In either case, the UWB signals are then communicated, either wirelessly or over wire 62 in FIG. 1 to the second data processor where the time of receipt at each of the three nodes is used to determine the distance to the recorded item from each of the nodes 60 and then the point in three-space where the item 30 is located. Alternately, the triangulation method for locating the R&C 10 in three-space uses signal direction discrimination of the signature signals at, at least three of the communication nodes 60, to determine location. This approach uses antenna systems that are able to distinguish within small tolerances, the direction from which a signal is received.

Again a triangulation is accomplished from this data. The foregoing discussion uses equipment, parts and techniques that are well known in the art.

In this manner, the second data processor 70 calculates and records in a second data base, a running account of the locations of the R&C 10 over time and the location information is recorded with date and time. In this manner, the location of the R&C 10 over the entire time that it is operating (transmitting) is recorded.

To determine the location and identity of an item 30 within inventory stores, it now is possible to call-up the record of the item 30, in the first database 52 to determine item identity and time of record, and then by matching the time of location in the second database 72 to the time of record, to obtain location. A report 80 may be then printed which show item identity and location.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An inventory control and management method comprising the steps of: providing a combination mobile means for reading labels and for communication (R&C); for at least one of a plurality of inventory items, positioning the R&C for reading an inventory label affixed to one of the inventory items in an inventory stores; creating a data file in the R&C corresponding to the label reading and a corresponding time stamp taken at the time of the label reading; transmitting the data file with the time stamp, from the R&C to a receiver; importing the data file from the receiver to a data processor; providing a network of fixed distributed communication nodes in proximity to the inventory stores; receiving a stream of signature ultra wide band (UWB) transmissions from the R&C at a plurality of the communication nodes; triangulating and recording the location of the R&C in three space at the time of the label reading, and storing location and identity information of the R&C in a database for use in controlling and managing the inventory items.

2. The method of claim 1 wherein the mobile means for reading labels and the means for communication are physically indistinguishable in three-space with respect to triangulation precision of the communication node network.

3. The method of claim 1 wherein the signature UWB transmissions are converted into a history file defining the movements of the R&C over time.

4. The method of claim 1 wherein the signature UWB transmissions carry the time stamp from the R&C.

5. The method of claim 1 wherein the signature UWB transmissions are time stamped upon receipt by the communication nodes.

6. The method of claim 5 wherein the triangulation method for locating the R&C in three-space uses discrimination of received time of the signature UWB transmissions at, at least three of the communication nodes, to determine location.

7. The method of claim 1 wherein the triangulation method for locating the R&C in three-space uses signal direction discrimination of the signature UWB transmissions at, at least three of the communication nodes, to determine location.

* * * * *